US010257005B2

(12) United States Patent
Löhning et al.

(10) Patent No.: US 10,257,005 B2
(45) Date of Patent: Apr. 9, 2019

(54) RADIO FREQUENCY (RF) COMMUNICATION SYSTEMS USING RF SWITCHING GUARD PERIODS TO TRANSMIT SPECIAL SYMBOLS IN BLOCK SYMBOL TRANSMISSIONS

(71) Applicant: National Instruments Corporation, Austin, TX (US)

(72) Inventors: Michael Löhning, Dresden (DE); Achim Nahler, Dresden (DE); Nikhil Kundargi, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 15/674,059

(22) Filed: Aug. 10, 2017

(65) Prior Publication Data
US 2018/0048506 A1 Feb. 15, 2018

Related U.S. Application Data

(60) Provisional application No. 62/373,421, filed on Aug. 11, 2016.

(51) Int. Cl.
*H04L 27/26* (2006.01)
*H04L 5/00* (2006.01)
*H04L 5/14* (2006.01)

(52) U.S. Cl.
CPC .......... *H04L 27/2607* (2013.01); *H04L 5/005* (2013.01); *H04L 5/14* (2013.01);
(Continued)

(58) Field of Classification Search
CPC . H04L 5/005; H04L 5/001; H04L 5/14; H04L 27/2626
See application file for complete search history.

(56) References Cited

U.S. PATENT DOCUMENTS 8,325,755 B2  12/2012 Lee et al.
9,191,161 B2  11/2015 Li et al.
(Continued)

OTHER PUBLICATIONS

Vieira et al., "*Reciprocity Calibration Methods for Massive MIMO Based on Antenna Coupling*", Department of Electrical Engineering, Lund University, Jan. 1, 2014, pp. 1-6.
(Continued)

*Primary Examiner* — Kabir A Timory
(74) *Attorney, Agent, or Firm* — E. Alan Davis; James W. Huffman

(57) ABSTRACT

An apparatus includes circuitry that processes a subframe as part of a time-domain signal frame structure used for radio frequency communications. The subframe includes a plurality of block symbols each having an associated time-domain guard period and one or more radio frequency (RF) switching guard periods. Each block symbol of the plurality of block symbols is either a common block symbol or a special block symbol. A common block symbol has a common time-domain guard period with all other common block symbols of the subframe. A special block symbol has a time-domain guard period different from the common time-domain guard period. All the special block symbols in the subframe are placed into the one or more RF switching guard periods.

24 Claims, 4 Drawing Sheets

(52) U.S. Cl.
CPC ...... *H04L 27/2602* (2013.01); *H04L 27/2626* (2013.01); *H04L 5/0048* (2013.01)

(56) References Cited

U.S. PATENT DOCUMENTS

| | | | |
|---|---|---|---|
| 2011/0032855 A1* | 2/2011 | Kim | H04L 5/0037 370/294 |
| 2015/0326286 A1 | 11/2015 | Wong et al. | |
| 2015/0326291 A1 | 11/2015 | Wong et al. | |
| 2015/0326383 A1 | 11/2015 | Wong et al. | |
| 2016/0248553 A1* | 8/2016 | Shimezawa | H04L 5/14 |
| 2017/0290013 A1 | 10/2017 | McCoy et al. | |

OTHER PUBLICATIONS

Harris et al., "*University of Bristol and Lund University Partner with NI to Set World Records in 5G Wireless Spectral Efficiency Using Massive MIMO*", dowloaded from www.ni.com, May 2016, pp. 1-7.

"*LTE in a Nutshell—Physical Layer*", Telesystem Innovations Inc. White Paper, 2010, pp. 1-10.

"*An Introduction to Orthogonal Frequency Division Multiplex Technology*", Keithley Instruments, Inc., 2008, pp. 1-66.

Huawei, "WF on CSI Acquisition in NR", 3GPP TSG RAB WG1 Meeting #85, May 23-27, 2016, pp. 1-4.

Huawei et al., "*WP on CSI Acquisition Framework in NR*", 3GPP TSG RAN WG1 Meeting #85, May 23-27, 2016, pp. 1-3.

"*Study on Latency Reduction Techniques for LTE*", 3GPP TR 36.881 Vo.6.0 Technical Report, Feb. 2016, pp. 1-92.

"*Study on Scenarios and Requirements for Next Generation Access Technologies*", SGPP TR 38.913 Vo.2.0, Feb. 2016, pp. 1-19.

Vieira et al., "*A Flexible 100-Antenna Testbed for Massive MIMO*", Department of Electrical Information Technology at Lund University, Jan. 1, 2014, pp. 1-7.

"Bristol and Lund Set a New World Record in 5G Wireless Spectrum Effciency" Bristol Univeristy, News, March: Massive MIMO demonstration, Mar. 23, 2016, pp. 1-6.

"Study on NR New Radio Access Technology", 3GPP TSG RAN Meeting #71, Goteborg, Sweden, Mar. 7-10, 2016, pp. 1-8.

"*LTE Small Cell Enhancement by Dual Connectivity*", Wireless World Research Forum, Outlook Visions and Research Directions for the Wireless World, Whitepaper, Nov. 2014, pp. 1-22.

"*LTE in a Nutshell: Protocol Architecture*" Telesystem Innovations Inc. White Paper, 2010, pp. 1-12.

"*LTE Random Access Procedure*" http://www.eventhelix.com/eventstudio/, Jul. 28, 2017, pp. 1-5.

Luther, "*5G Massive MIMO Testbed: From Theory to Reality*", National Instruments, Jun. 8, 2016, pp. 1-11.

"*Introduction to the NI mmWave Transceiver System Hardware*", National Instruments, Apr. 20, 2016, pp. 1-8.

"National Instruments Wireless Research Handbook", National Instruments, May 2016, pp. 1-37.

Shepard et al. "*Argos: Practical Many-Antenna Base Stations*" MobiCom 12, Aug. 22-26, 2012, Istanbul, Turkey, pp. 53-64.

Khoolenjani, et al. "*Distribution of the Ratio of Normal and Rice Random Variables*" Digital Commons @WayneState, *Journal of Modern Applied Statistical Methods*, vol. 12, Issue 2, Article 27, Nov. 1, 2013, pp. 1-15.

Shen et al. "*Channel Estimation in OFDM Systems*", Freescale Semiconductor, Inc. Application Note, Jan. 2006, pp. 1-16.

* cited by examiner

FIG. 1 (Prior Art)
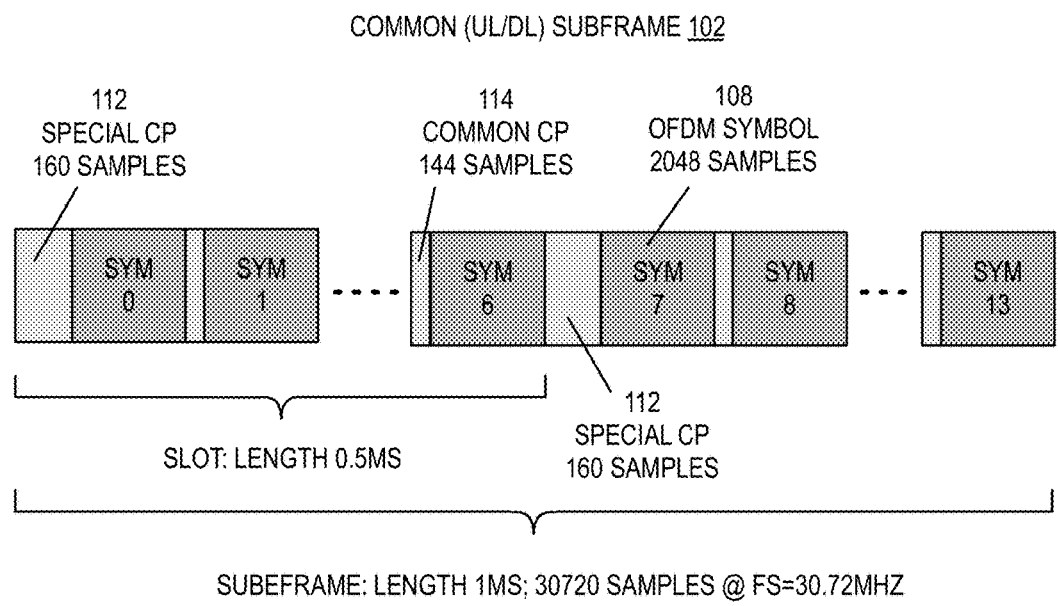
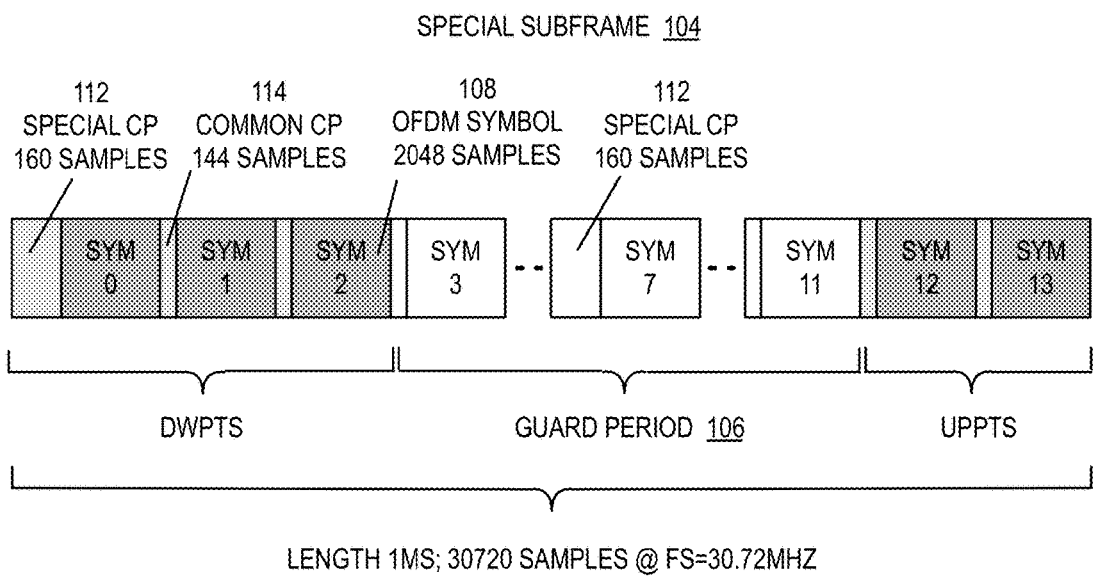

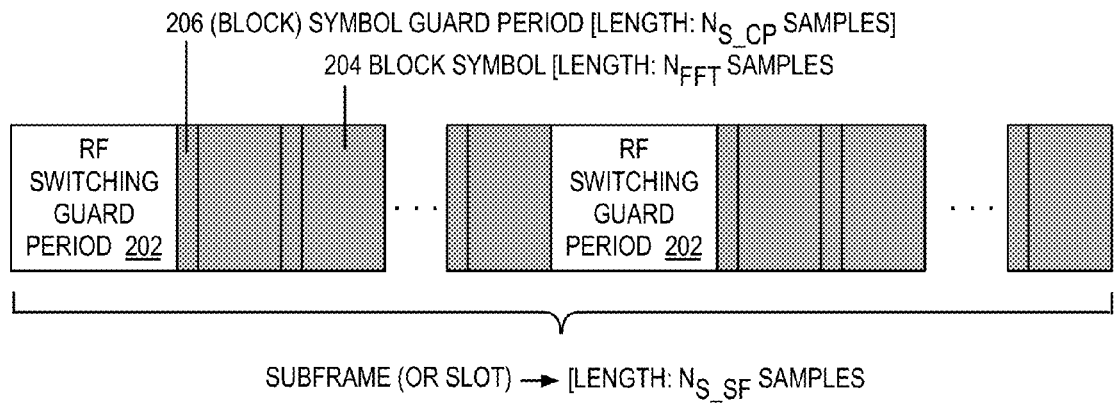
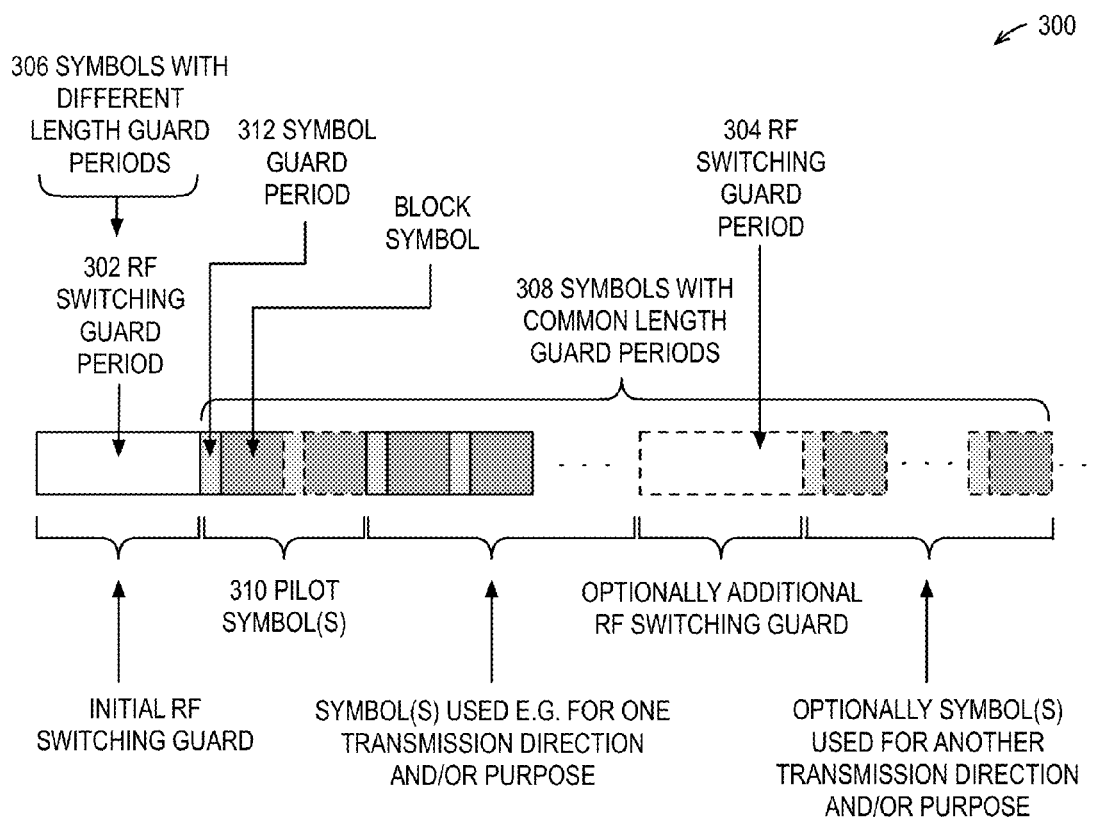

RADIO FREQUENCY (RF) COMMUNICATION SYSTEMS USING RF SWITCHING GUARD PERIODS TO TRANSMIT SPECIAL SYMBOLS IN BLOCK SYMBOL TRANSMISSIONS

This application claims the benefit of U.S. Provisional Application No. 62/373,421, filed on Aug. 11, 2016 which is hereby incorporated by reference in its entirety as though fully and completely set forth herein.

BACKGROUND

Technical Field

The disclosed embodiments relate to block symbol based radio frequency (RF) telecommunications.

Flexible (scalable) frame structures are being considered for block symbol transmissions within the new 5G (fifth generation) cellular communication standard being considered by 3GPP (third generation partnership project). Typical constraints for frame structure parameters such as FFT (fast Fourier transform) size, sample rate, and subframe length lead to subframe structures that often do not allow for the use of a common symbol guard period for all block symbols of a subframe where subframe duration must align with a common baseline subframe period. The traditional approach to align the subframe duration to specific constraints, such as that described for the LTE (long term evolution) standard, is to extend the guard period for one or more block symbols that are actually or potentially used for regular signal transmissions. This traditional approach, however, generates special symbols with different guard period lengths in addition to regular symbols with common guard period lengths and thereby requires signal processing circuitry for regular signal transmissions in transmitter and receiver implementations to cope with these different symbol guard lengths per subframe.

FIG. 1 (Prior Art) provides a diagram of an example time-domain subframe structure for the LTE (long term evolution) wireless cellular communication standard including a common subframe 102 and a special subframe 104 with TDD (time division duplex) switching guard periods 106 and OFDM (orthogonal frequency division multiplex) symbols 108. For example, with respect to the 20 MHz (mega-Hertz) bandwidth LTE mode with a normal cyclic prefix and a sampling rate of 30.72 MSps (mega samples per second), the subframe structure can be parameterized as follows:

OFDM symbol length: 2048 samples;
common cyclic prefix (CP) length: 144 samples;
special cyclic prefix (CP) length: 160 samples
zero (RF TDD switching) guard period: multiple OFDM symbols (with CP); and
subframe length: 1 ms (millisecond) including 14 OFDM symbols (with CP).

With the above OFDM symbol length and common CP length 114, two special OFDM symbols were introduced for each subframe with a different (e.g., larger) cyclic prefix size 112 in order to fulfill the LTE specific subframe length requirement of 1 ms. As indicated above, one problem with this introduction of special OFDM symbols with different CP sizes 112 is that signal processing circuitry within receivers and transmitters are forced to recognize and process different CP sizes 112 within regular signal transmissions for each communication subframe.

SUMMARY

The disclosed embodiments place special block symbols with guard period lengths different from regular symbols into parts of a frame or subframe that are designated as RF (radio frequency) switching guard periods and, therefore, are not traditionally used for regular signal transmissions. RF switching guard periods are typically special guard periods included within transmission frames or subframes of block symbols that are typically included to deal with RF switching transients. By placing symbols with different guard periods within these RF switching guard periods, the disclosed embodiments allow definition of flexible scalable frame structures. For example, frame structures according to the disclosed embodiments can fulfill subframe (or slot) length constraints with block symbol sizes and common symbol guard periods that are independently adapted to target application scenarios and channel conditions while still using one common guard period for all block symbols of a subframe that are used for actual regular signal transmissions. Further, the frame structures of the disclosed embodiments allow for simplified transmitter and receiver implementations because they can work with one common guard period per subframe for all block symbols used for actual regular signal transmissions. Other variations can also be implemented while still taking advantage of the new frame structures described herein.

In some embodiments, a method includes processing a subframe as part of a time-domain signal frame structure used for radio frequency communications. The subframe includes a plurality of block symbols each having an associated time-domain guard period and one or more radio frequency (RF) switching guard periods. Each block symbol of the plurality of block symbols is either a common block symbol or a special block symbol. A common block symbol has a common time-domain guard period with all other common block symbols of the subframe. A special block symbol has a time-domain guard period different from the common time-domain guard period. All the special block symbols in the subframe are placed into the one or more RF switching guard periods.

In some embodiments, an apparatus includes circuitry that processes a subframe as part of a time-domain signal frame structure used for radio frequency communications. The subframe includes a plurality of block symbols each having an associated time-domain guard period and one or more radio frequency (RF) switching guard periods. Each block symbol of the plurality of block symbols is either a common block symbol or a special block symbol. A common block symbol has a common time-domain guard period with all other common block symbols of the subframe. A special block symbol has a time-domain guard period different from the common time-domain guard period. All the special block symbols in the subframe are placed into the one or more RF switching guard periods.

In some embodiments, a non-transitory computer-readable medium having instructions stored thereon that are capable of causing or configuring a computing system to perform operations that include processing a subframe as part of a time-domain signal frame structure used for radio frequency communications. The subframe includes a plurality of block symbols each having an associated time-domain guard period and one or more radio frequency (RF) switching guard periods. Each block symbol of the plurality of block symbols is either a common block symbol or a special block symbol. A common block symbol has a common time-domain guard period with all other common block symbols of the subframe. A special block symbol has a time-domain guard period different from the common time-domain guard period. All the special block symbols in the subframe are placed into the one or more RF switching guard periods.

DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

FIG. 1 (Prior Art) provides a diagram of an example time-domain subframe structure for the LTE (long term evolution) wireless cellular communication standard including a common subframe and a special subframe with TDD (time division duplex) switching guard periods and OFDM (orthogonal frequency division multiplex) symbols.

FIG. 2 is a time-domain frame structure of a block symbol based signal transmission having RF switching guard periods.

FIG. 3 provides an example embodiment for a subframe (slot) structure for a time-domain frame structure that places symbols with different guard periods (e.g., special guard periods) within RF switching guard periods.

DETAILED DESCRIPTION

Terms

Figure 4:
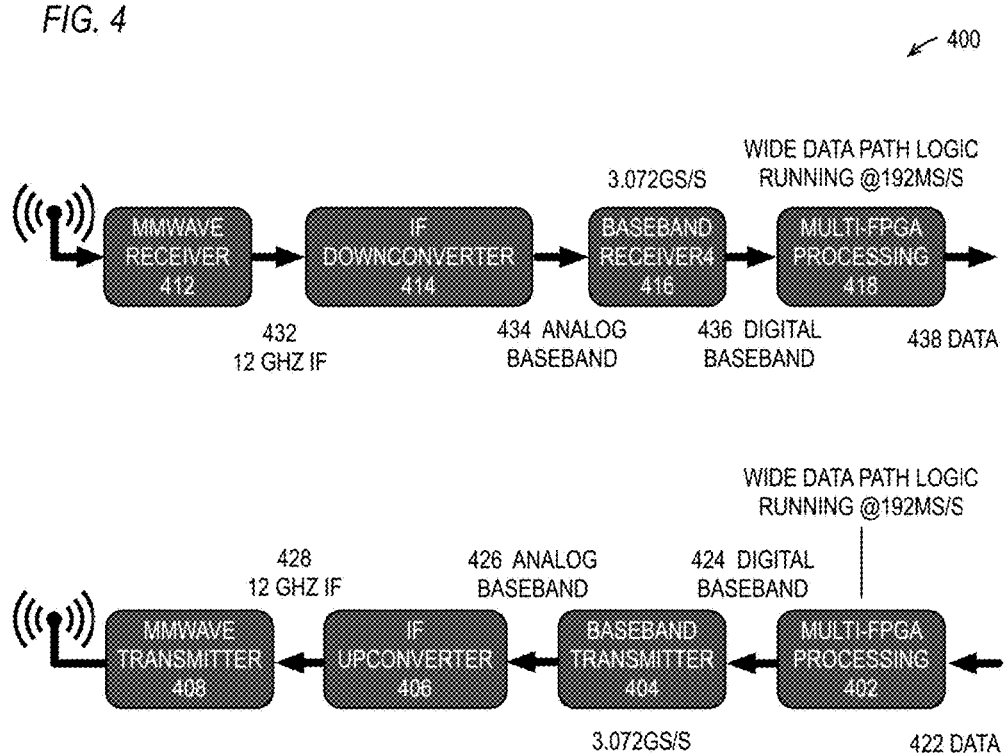
FIG. 4 is a block diagram of an example embodiment for a mm (millimeter) wave communication system that can transmit and receive block symbols including the frame structures described herein that place block symbols with different guard periods into RF switching guard periods.

The following is a glossary of terms used in the present application:

The term radio frequency (RF) switching guard period is intended to be interpreted according to its well-understood meaning, which includes a time-domain guard period included within a transmission subframe of block symbols to accommodate the effects of RF switching transients.

The term time-domain guard period is intended to be interpreted according to its well-understood meaning, which includes the number of samples added before or after a block symbol. Time-domain guard periods can be zero prefixes, cyclic prefixes, post fixes, for example. The time-domain guard periods are added to cope with the effects of time dispersive channels, and to enable efficient frequency-domain signal processing, for example.

The term block symbol is intended to be interpreted according to its well-understood meaning, which includes a collection of samples output by block processing a collection of input samples. Block symbol based transmission schemes include FFT-based transmission schemes such as OFDM, SC-FDE (single-carrier frequency-domain equalization), SC-FDMA (single-carrier frequency division multiple access), for example.

The term RF switching transient is intended to be interpreted according to its well-understood meaning, which includes that an RF switching transient occurs when a radio changes from a transmit mode to a receive mode or from a receive mode to a transmit mode, or when the analog or digital beam direction of the radio changes, or when the RF TX and/or RX gain setting value changes. For example, in the 3GPP New Radio (NR) standard an RF switching transient occurs during a beam switching event. The NR standard specifies analog and digital beamforming-based transmission schemes.

The term subframe is intended to be interpreted according to its well-understood meaning, which includes a predetermined time duration that is a unit of a radio frame. The predetermined time duration is defined by a standards organization, e.g., 3GPP. For example, in the LTE standard the predetermined time duration for a subframe is 1 millisecond. For another example, the NR standard defines multiple predetermined time durations for a subframe, and the network operator can dynamically select which one of the multiple time durations will be used.

The term pilot symbol is intended to be interpreted according to its well-understood meaning, which includes a block symbol or part(s) of a block symbol, either in time or frequency domain, that facilitates channel estimation, equalization, or slot time derivation.

The disclosed embodiments place special block symbols with guard period lengths different from regular symbols into parts of a frame or subframe that are designated as RF switching guard periods and, therefore, are not traditionally used for regular signal transmissions. RF switching guard periods are typically special guard periods included within transmission frames or subframes of block symbols that are typically included to deal with RF switching transients. By placing symbols with different guard periods within these RF switching guard periods, the disclosed embodiments allow definition of flexible scalable frame structures.

It is noted that the disclosed embodiments can be used with respect to any desired block symbol based transmission scheme that adds time-domain guard periods to each block symbol transmission and that use RF switching guard periods. For example, block symbol based transmission schemes that can use the disclosed embodiments include FFT-based transmission schemes such as OFDM, SC-FDE (single-carrier frequency-domain equalization), SC-FDMA (single-carrier frequency division multiple access), and/or other block symbol based transmission schemes. The time-domain guard periods can be, for example, zero prefixes, cyclic prefixes, post fixes, and/or other time-domain guard periods. The time-domain guard periods can be added, for example, to cope with the effects of time dispersive channels, to enable efficient frequency-domain signal processing, and/or for other purposes. Further, the transmissions can be organized in subframes (or slots), and the subframes can include one or multiple block symbols and one or multiple RF switching guard periods. The RF switching guard periods can be included to cope with a variety of RF hardware dependent switching delays and related transients caused by one or more of the following: (1) TX-to-RX switching, RX-to-TX switching for TDD (time division duplex) transmissions, (2) beam switching, (3) changing the carrier frequency, (4) changing gain for TX and/or RX, and/or (5) other purposes. Further, the RF switching guard periods can be used to avoid the overlap of time-advanced (uplink) transmissions with preceding (downlink) reception in TDD operation and/or for other purposes. These RF switching periods are typically not used for regular signal transmissions and, for example, are often set to zero and/or to some other fixed information values. Other variations can also be implemented while still taking advantage of the new frame structures described herein.

FIG. 2 is a time-domain frame structure of a block symbol based signal transmission having RF switching guard periods 202. RF switching guard periods typically include one or multiple block symbols (including the corresponding symbol guards). For example, RF (TDD) switching guard periods in the LTE standard have a length of one or multiple block symbols as described herein. Block symbols 204 (e.g., having $n_{fft}$ samples) follow the RF switching guard period 202, and a block symbol guard period 206 (e.g., having $n_{s\_cp}$ symbols) precedes each block symbol 204. Each block symbol guard period 206 can include, for example, a cyclic prefix (CP).

Example Subframe Structures

The disclosed embodiments are applicable, for example, to subframe structures with the following specific characteristics: (1) the subframe starts with an RF switching period, and (2) the initial RF switching period is followed by one or multiple pilot block symbols which allow slot timing to be derived and adjusted for the current slot. These one or multiple pilot blocks following the RF switching period can also be also used for other purposes such as for channel estimation, for equalization, and/or for other purposes. The remaining part of the subframe can be arbitrarily filled with block symbols of different types, but identical length. This example subframe structure also includes the option to include additional RF switching guard periods with lengths of one or multiple block symbols. It is further noted that each block symbol also has a symbol guard period.

FIG. 3 provides an example embodiment for a subframe (slot) structure 300 for a time-domain frame structure that places symbols with different guard periods (e.g., special guard periods) within RF switching guard periods. As shown for the example subframe structure 300 of FIG. 3, the disclosed embodiments place all (one or multiple) of the block symbols 306 with potentially different guard periods into the initial RF switching guard period 302 at the beginning of the subframe 300. The initial RF switching guard 302 can thereby be used to align the subframe 300 to a given length constraint for the block symbol transmissions without requiring special symbols with different guard period lengths to be inserted within the regular symbols 308 for the frame. The disclosed embodiments thereby provide simple and effective alignment to given subframe length constraints while allowing the actual TX/RX (transmit/receive) signal processing, which starts with transmitting/receiving of the pilot block symbols 310, to work with one common symbol guard period 312 throughout the whole subframe 300 including any additional RF switching guard periods 304 and/or additional symbols.

Example Additional Constraints on the Symbol Guard Period Length

Typically, the symbol guard period lengths are selected in such a way that they match to the delay spread characteristics of the transmission channel. This selection of the symbol guard period length is a common necessary condition to mitigate or reduce inter-symbol-interference.

In addition to defining the symbol guard period lengths such that they fulfill this condition, the symbol guard period length can also be selected to ensure that the number of guard samples within the symbol guard period is a positive integer multiple of a power of 2 such that the number of samples per symbol guard is equal to $m \cdot 2^K$, where "m" is a positive integer and where "k" is a non-negative integer. This additional constraint or selection criterion for the symbol guard period length allows efficient parallel wide data path signal processing with respect to the guard period handling.

It is noted that this additional constraint or selection criterion also allows for $2^K$ (or multiples of $2^K$) baseband samples to be combined into wide data paths to communicate the samples, and the guard period related signal processing can then be performed in parallel on the combined samples within the wide data path. Thus, this wide data path signal processing allows for the signal processing to be parallelized and applied to multiple samples that are combined and communicated through a wide data path sample. This parallel processing of samples combined into a wide data path can be implemented, for example, using efficient parallel high-throughput implementations, such as parallel processing using multiple FPGAs (field programmable gate arrays), complex programmable logic devices (CPLDs), and/or other programmable logic devices. Other variations could also be implemented.

Example Determination Techniques for Frame Structure Parameters

The example steps described below can be used to determine and select the frame structure parameters including the common symbol guard length and the special symbol guard length. This determination of the frame structures parameters is dependent upon the application scenario, the channel conditions, and/or other application related details. For example, the following method shows how common symbol guard length ($t_{cp}$) and special symbol guard length ($t_{special\_cp}$) are derived from the knowledge of the following:
  the delay spread ($\Delta_{sp}$),
  the common symbol guard length ($t_{cp}$),
  the number of symbols ($n_{special\_symb}$) with a special symbol guard length ($t_{special\_cp}$) (e.g., "$n_{special\_symb}$" represents the number of block symbols in a subframe that contain a special symbol guard instead of the common symbol guard),
  the subframe/slot duration ($t_{sf}$),
  the sampling rate ($f_s$), and
  the FFT size ($n_{fft}$).

These parameters are used as input parameters for the following example method and related variations that can be used to determine and select a common symbol guard length ($t_{cp}$) and a special symbol guard length ($t_{special\_cp}$) for a frame structure.

1. Select common symbol guard length: $t_{cp} > \Delta_{sp}$.
2. Determine number of samples for common symbol guard length ($n_{s\_cp}$). For one example embodiment, a ceil(x) function can be used to select the largest integer value not less than "x" such that $n_{s\_cp} = \text{ceil}(t_{cp} * f_s)$. For another example embodiment, the following extended rule can be used to define symbol guard period lengths that additionally enable efficient wide data path processing:

$$n_{s\_cp} = \text{ceil}(t_{cp} * f_s / W) * W$$

where $W = 2^K$ is the wide data path width (i.e., the number of samples combined into a wide date path sample). It is also noted that this extended rule also covers the initial example rule as special case where K=0 such that $W = 2^K = 1$, and the wide data path (W) reduces to 1 (i.e., wide data path processing reduces to normal per sample processing).

3. Determine number of samples per subframe/slot ($n_{s\_sf}$):
   a. $n_{s\_sf} = t_{sf} * f_s$
   b. $n_{s\_sf} = n_{symb} * n_{fft} + (n_{symb} - n_{special\_symb}) * n_{s\_cp} + n_{s\_special\_cp\_sum}$, where $n_{symb}$ is the number of symbols per subframe/slot and where $n_{s\_special\_cp\_sum}$ is the total number of samples to be considered for all special symbol guards introduced in the subframe/slot.

4. Determine number of block symbols per subframe/slot based on 3a and 3b:

$$n_{symb} = \text{floor}((n_{s\_sf} - n_{special\_symb} * n_{fft})/(n_{fft} n_{s\_cp})) + n_{special\_symb},$$

where the floor(x) function selects the largest integer value not greater than "x".

5. Determine an integer number of samples ($n_{s\_special\_cp}$) for the special symbol guard length (of one special symbol) that fulfils the following condition:

$$n_{s\_special\_cp} * n_{special\_symb} = n_{s\_special\_cp\_sum},$$

where $n_{s\_special\_cp\_sum} = n_{s\_sf} - n_{symb} * n_{fft} - (n_{symb} - n_{special\_symb}) * n_{s\_cp}$. It is further noted that this example calculation rule assumes that all special symbol guard periods introduced into a subframe have the same length. The disclosed embodiments, however, are not restricted to these conditions. Rather, multiple special symbols with different special symbol guard period lengths can be introduced and used. As such, a more general formulation of the corresponding calculation rule is the following:

$$\sum_{i=1}^{n_{special\_symb}} n_{s\_special\_cp}(i) = n_{s\_special\_cp\_sum}$$

Further, it is noted that the number of special symbols ($n_{special\_symb}$) can act as a selectable design parameter for this method that can help to fulfill additional frame structure constraints; however, it might be also restricted by the overall length of the RF switching periods and/or further frame structure constraints. For one example embodiment, the number of special symbols ($n_{special\_symb}$) can be simply set to one thereby leading to the following calculation rule:

$$n_{s\_special\_cp} = n_{s\_special\_cp\_sum}/$$
$$n_{special\_symb} = n_{s\_special\_cp\_sum}/1.$$

6. Determine special symbol guard length $t_{special\_cp} = n_{s\_special\_cp}/f_s$.

Example Block Symbol RF Communication Systems

It is noted that the disclosed embodiments can be used with respect to any of a wide variety of block symbol based transmission schemes for RF communication systems that add time-domain guard periods to each block symbol transmission and that use RF switching guard periods. It is also noted that as used herein, a "radio frequency" or RF communications means an electrical and/or electro-magnetic signal conveying useful information and having a frequency from about 3 kilohertz (kHz) to thousands of gigahertz (GHz) including millimeter (mm) wave transmissions between 30-300 GHz having wavelengths of 1-10 mm, regardless of the medium through which such signal is conveyed. The RF block symbol transmissions may be transmitted through a variety of mediums (e.g., air, free space, coaxial cable, optical fibers, copper wire, metal layers, and/or other RF transmission mediums).

FIG. 4 is a block diagram of an example embodiment for a mm (millimeter) wave communication system 400 that can transmit and receive block symbols including the frame structures described herein that place block symbols with different guard periods into RF switching guard periods. The example embodiment of FIG. 4 includes a transmit path and a receive path. The transmit path includes multi-FPGA processing circuitry 402, a baseband transmitter 404, an IF upconverter 406, and an mm wave transmitter 408. The receive path includes an mm wave receiver 412, an IF downconverter 414, a baseband receiver 416, and multi-FGPA processing circuitry 418. The transmit path and the receive path that are communicating with each other can be located in different devices (e.g., base station and user equipment for cellular communications). If bi-directional communications are desired, the different devices can each include a transmit path and a receive path. Other variations can also be implemented.

Looking to the transmit path, transmit data 422 is sent to multiple FPGAs 402 that provide multi-FPGA processing of the transmit data. The transmit data 422 can be generated by other processing circuitry such as a control processor or other circuitry. These FPGAs 402 can operate, for example, at 192 MS/s (mega samples per second) using efficient parallel wide data path implementations with, for example, multiple (e.g. 16) data elements (e.g., baseband samples) per wide data path sample. The FPGAs 402 output digital baseband signals 424 to the baseband transmitter 404. The baseband transmitter 404 includes a digital-to-analog converter (DAC) that converts the digital baseband samples to analog baseband signals 426. The baseband transmitter 404 including the DAC can operate, for example, at 3.072 GS/s (Giga samples per second) and can receive digital baseband samples 424 from one or multiple FPGAs 422 within the multi-FPGA processing circuitry. The analog baseband signals 426 are received by an IF (intermediate frequency) upconverter 406 that mixes the analog baseband signals 426 to higher frequency IF signals 428. The frequency for the upconverted IF signals 428 can be, for example, 12 GHz (Giga Hertz). These IF signals 428 are received by the mm wave transmitter 408 which further upconverts these signals to mm wave transmissions. For example, the mm wave transmitter 408 can mix the IF signals 428 to 71-76 GHz and/or another desired mm wave frequency or frequency range.

Looking to the receive path, the mm wave receiver 412 receives the mm wave transmissions from the mm wave transmitter 408. For example, these mm wave transmissions can be 1-76 GHz and/or another desired mm wave frequency or frequency range. The mm wave receiver 412 downconverts these mm wave transmissions to lower frequency IF signals 432. For example, the mm wave transmissions can be mixed down to 12 GHz. The IF signals 432 are then received by an IF downconverter 414 that mixes the IF signals 432 down to analog baseband signals 434. The analog baseband signals 434 are then received by a baseband receiver 416. The baseband receiver 416 includes an analog-to-digital converter (ADC) that converts the analog baseband signals 434 to digital baseband signals 436. The baseband receiver 416 including the ADC can operate, for example, at 3.072 GS/s (Giga samples per second) and can send digital baseband samples 436 to one or multiple FPGAs 418 within the multi-FPGA processing circuitry. The FPGAs 418 receive the digital baseband signals 436 and digital data that can be processed by additional processing circuitry such as a control processor or other circuitry. These FPGAs 418 can operate, for example, at 192 MS/s (mega samples per second) using efficient parallel wide data path implementations with, for example, multiple (e.g., 16) data elements (e.g., baseband samples) per wide data path sample.

Figure 5:
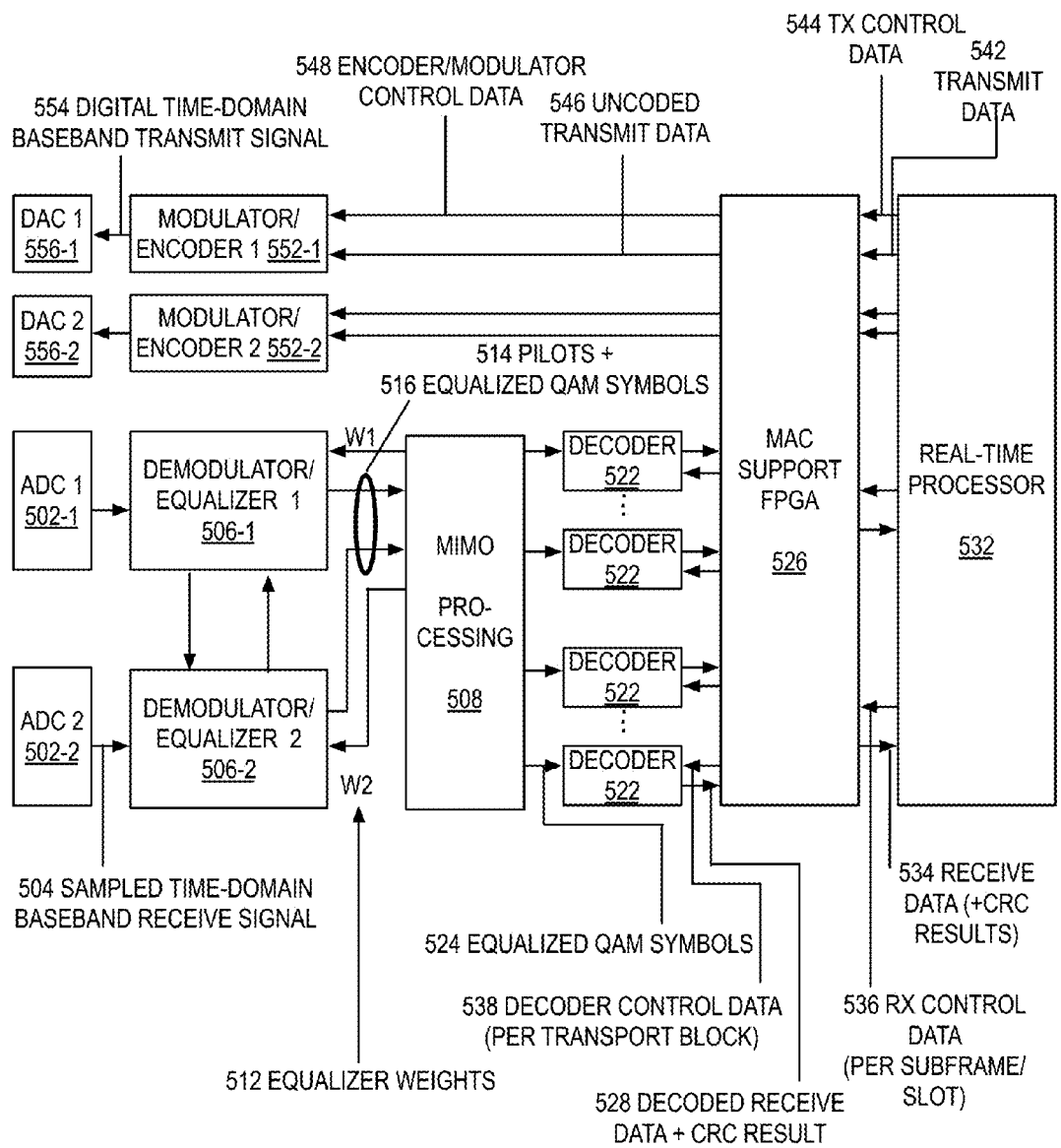
FIG. 5 is a block diagram of an example embodiment for circuitry that can be used to provide a baseband receiver, a baseband transmitter, multi-FPGA processing circuitry, and a real-time processor with respect to the embodiment of FIG. 4.

FIG. 5 is a block diagram of an example embodiment for circuitry that can be used to provide a baseband receiver, a baseband transmitter, multi-FPGA processing circuitry, and a real-time processor with respect to the embodiment of FIG. 4. The embodiment of FIG. 5 provides two receive/transmit streams and related processing circuitry.

Looking to the embodiment of FIG. 5, two analog-to-digital converters (ADC1 502-1, ADC2 502-2) receive analog baseband signals and output sampled digital baseband signals 504 (i.e., sampled time-domain baseband receive signals) to two demodulators/equalizers 506. The demodulators/equalizers (DEMODULATOR/EQUALIZER 1 506-1, DEMODULATOR/EQUALIZER 2 506-2) demodulate and equalize the respective receive signals. Due to the complexity of the MIMO (multiple input multiple output) equalization task, some parts of the related functionality are realized by a separate MIMO processing circuitry (MIMO PROCESSING 508). Specifically, this MIMO processing circuitry 508 performs the MIMO channel estimation and the calculation of the equalizer weights 512. For this, it uses the (pre-processed) pilot signals/symbols 514 extracted from both received baseband signals as input. These (pre-processed) pilot signals 514 are provided by the demodulators/equalizers 506. The equalizer weights 512 (W1, W2) calculated by the MIMO processing circuitry 508 are fed back to the demodulators/equalizers 506, which can perform the final MIMO equalization using these equalizer weights 512. To support this final MIMO equalization task, the demodulators/equalizers 506 can exchange intermediate equalization results. The final output of the demodulators/equalizers 506 are equalized QAM (quadrature amplitude modulation) symbols 516 for both receive streams. These equalized QAM symbols 516 are provided to the MIMO processing circuitry 508, which can distribute the equalized QAM symbols 524 to multiple decoders (DECODER 522). It is noted that the upper set of decoders 522 can be used for decoding the first receive stream and the lower set of decoders 522 can be used for decoding the second stream. The decoders 522 output decoded digital receive data 528 plus CRC (cyclic redundancy check) results per transport block to the MAC support FPGA 526. The MAC support FPGA 526 can collect the output data 528 of all decoders 522, can further process them, and can provide them to the real-time processor (REAL-TIME PROCESSOR 532) in a synchronized and consistent manner. The real-time processor 532 can perform further operations on the received data 528 (and CRC results) provided by the MAC support FPGA 526. Further, it can provide receiver (RX) control information 536 to the MAC support FPGA 526 and/or other receiver FPGAs (not shown) to control and configure the respective receivers. For example, the real-time controller 532 can provide the control data 536 for all decoders 522 per subframe to the MAC support FPGA 526, and the MAC support FPGA 526 can distribute these control data 538 to each decoder 522 to provide the configuration used to decode the related transport block. A similar functionality can be provided by the real-time processor 532 for the transmit paths. Uncoded digital transmit data 542 and related transmitter (TX) control data 544 are sent from the real-time processor 532 to the MAC support FPGA 526, which distributes the digital transmit data 546 as well as the respective encoder/modulator control data 548 to the two modulators/encoders (MODULATOR/ENCODER 1 552-1, MODULATOR/ENCODER 2 552-2). The modulators/encoders 552 encode the transmit data 546 and perform the transmit modulation, e.g., generate the digital time-domain baseband transmit signals 554. These digital time-domain baseband transmit signals 554 are sent by the modulators/encoders 552 to the digital-to-analog converters (DAC1 556-1, DAC2 556-2). The DACs 556 receive the digital baseband signals 554 and output analog baseband signals. It is noted that demodulators/equalizers, modulators/encoders, MIMO processing circuitry, and decoders can be implemented using multiple parallel FPGAs.

The disclosed embodiments can also be used with respect to new cellular communication standards, such as the new 5G cellular communication standard being considered by 3GPP. To provide more flexibility and extendibility for such cellular communication standards, a flexible frame structure is desirable. For example, the frame structure and numerology is preferably flexible, i.e., scalable with respect to:

different transmission bandwidths with scalability of FFT size, sample rate, block symbol duration;
different application scenarios, e.g., different throughput and latency requirements with scalability of block symbol duration, subframe duration, subframe structure (e.g., UL/DL configuration, pilots, etc.); and
different channel conditions with scalability of:
block symbol guard length;
sub-carrier spacing (controlled by FFT size & sample rate);
block symbol duration; and
subframe structure (pilot placement, etc.).

Along with a scalable frame structure and numerology, the subframe duration might also scale. The disclosed embodiments provide an efficient frame structure that provides the desired flexibility and extendibility for the new 5G cellular communication standard.

It is further noted that the frame structure parameters are preferably not chosen arbitrarily, but are chosen to fulfill certain constraints. For example, the number of samples per block symbol is set to a power of two (2) to enable efficient frequency-domain (FD) processing using FFTs (fast Fourier transforms) and IFFTs (inverse fast Fourier transforms). The subframe boundaries are aligned to a common baseline subframe period such that an integer number of subframes fits into the baseline subframe period. For example, a baseline subframe period being considered in 3GPP is 1 ms (millisecond). The frequency-domain subcarrier spacing is aligned to baseline sub-carrier spacing such that the sub-carrier spacing is an integer multiple of a baseline sub-carrier spacing with the related scaling factor composed of a specific set of prime factors (e.g., set $\{2, 5, \ldots\}$). For example, the baseline sub-carrier spacing discussed in 3GPP is 15 kHz with related scaling factors of a power of two (e.g., $2^N$). Advantageously, the disclosed embodiments are not limited to scaling factors based on the power of two and can be used with other block symbol transmission implementations. It is also noted that this subcarrier spacing alignment can lead to constraints on the parameter pair FFT size and sample rate because the subcarrier spacing is typically defined as sample rate/FFT size.

The disclosed embodiments can also be used for block symbol based transmission schemes for massive MIMO cellular telecommunication systems as described in U.S. Published Patent Application 2015/0326291, entitled "SIGNALING AND FRAME STRUCTURE FOR MASSIVE MIMO CELLULAR TELECOMMUNICATION SYSTEMS," which is hereby incorporated by reference in its entirety. Such massive MIMO (multiple input, multiple output) communication systems can be used for 5G dynamic TDD (time division duplex) air interfaces. The 5G ($5^{th}$ generation) mobile telecommunications is able to span a wide variety of deployment scenarios (e.g., Rural, Urban Macro, Dense Urban, Indoor, etc.) in a flexible and scalable manner. In particular, massive MIMO reciprocity-based TDD air interfaces allow for symbol-level switching and potential configurability that in turn allow for features to support three primary aspects of 5G air interfaces, namely enhanced Mobile BroadBand (eMBB), massive Machine Type Communications (mMTC) and Ultra-Reliable and Low Latency Communications (URLLC). Example embodiments for massive MIMO communication systems and related signaling and frame structures are described within U.S. Published Patent Application 2015/0326291.

It is noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the new frame structures described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:
1. A method, comprising:
processing a subframe as part of a time-domain signal frame structure used for radio frequency communications;
wherein the subframe includes:
a plurality of block symbols each having an associated time-domain guard period;
one or more radio frequency (RF) switching guard periods; and
wherein the time-domain guard period comprises a zero prefix, cyclic prefix or post fix;
wherein each block symbol of the plurality of block symbols is either a common block symbol or a special block symbol;
wherein the common block symbols have a common time-domain guard period;
wherein the special block symbols have a time-domain guard period different from the common time-domain guard period;
wherein all the special block symbols in the subframe are placed into the one or more RF switching guard periods; and
wherein two or more of the special block symbols have a time-domain guard period that is different from each other and that is different from the common time-domain guard period.

2. The method of claim 1,
wherein the subframe also includes:
  one or more pilot symbols; and
wherein the one or more pilot symbols are common block symbols and precede the other common block symbols of the subframe.

3. The method of claim 1,
wherein the subframe begins with one of the one or more RF switching guard periods.

4. The method of claim 1,
wherein a number of samples within the common time-domain guard period is a positive integer multiple of a power of two.

5. The method of claim 1,
wherein the common time-domain guard period ($t_{cp}$) is greater than a delay spread of a channel in which the subframe is transmitted;
wherein a number of samples of the common time-domain guard period ($n_{s\_cp}$) is a ceiling function of a product of $t_{cp}$ and a sampling rate of the subframe ($f_s$);
wherein a number of samples of the subframe ($n_{s\_sf}$) is a sum of P, Q and R;
wherein P is a product of a number of block symbols of the subframe ($n_{symb}$) and a Fast Fourier Transform (FFT) size ($n_{fft}$) of the block symbols;
wherein Q is a product of $n_{s\_cp}$ and the difference of $n_{symb}$ minus a number of the special block symbols of the subframe ($n_{special\_symb}$);
wherein R is a total number of samples to be considered for all time-domain guard periods of the subframe different from the common time-domain guard period ($n_{s\_special\_cp\_sum}$);
wherein $t_{sf}$ is a duration of the subframe;
wherein $n_{symb}$ is a sum of $n_{special\_symb}$ and a floor function of a quotient of U and V;
wherein U is $n_{s\_sf}$ minus a product of $n_{special\_symb}$ and $n_{fft}$; and
wherein V is a sum of $n_{fft}$ and $n_{s\_cp}$.

6. The method of claim 5,
wherein $n_{s\_special\_cp\_sum}$ is $n_{s\_sf}$ minus the product of $n_{symb}$ and $n_{fft}$ minus the product of $n_{s\_cp}$ and the difference of $n_{symb}$ minus $n_{special\_symb}$.

7. The method of claim 5,
wherein $$n_{s\_special\_cp\_sum} = \sum_{i=1}^{n_{special\_symb}} n_{s\_special\_cp}(i);$$

wherein $n_{s\_special\_cp}(i)$ is a number of samples of the time-domain guard period of the i-th special block symbol of the subframe.

8. The method of claim 1,
wherein a number of samples of the common time-domain guard period is a product of W and a ceiling function of a quotient of a product of the common time-domain guard period and a sampling rate and W;
wherein W is a width of a wide data path of digital signal processing circuitry that processes the number of samples of the common time-domain guard periods.

9. An apparatus, comprising:
circuitry that processes a subframe as part of a time-domain signal frame structure used for radio frequency communications;
wherein the subframe includes:
  a plurality of block symbols each having an associated time-domain guard period;
  one or more radio frequency (RF) switching guard periods; and
  wherein the time-domain guard period comprises a zero prefix, cyclic prefix or post fix;
wherein each block symbol of the plurality of block symbols is either a common block symbol or a special block symbol;
wherein the common block symbols have a common time-domain guard period with all other common block symbols of the subframe;
wherein the special block symbols have a time-domain guard period different from the common time-domain guard period;
wherein all the special block symbols in the subframe are placed into the one or more RF switching guard periods; and
wherein two or more of the special block symbols have a time-domain guard period that is different from each other and that is different from the common time-domain guard period.

10. The apparatus of claim 9,
wherein the subframe also includes:
  one or more pilot symbols; and
wherein the one or more pilot symbols are common block symbols and precede the other common block symbols of the subframe.

11. The apparatus of claim 9,
wherein the subframe begins with one of the one or more RF switching guard periods.

12. The apparatus of claim 9,
wherein a number of samples within the common time-domain guard period is a positive integer multiple of a power of two.

13. The apparatus of claim 9,
wherein the common time-domain guard period ($t_{cp}$) is greater than a delay spread of a channel in which the subframe is transmitted;
wherein a number of samples of the common time-domain guard period ($n_{s\_cp}$) is a ceiling function of a product of $t_{cp}$ and a sampling rate of the subframe ($f_s$);
wherein a number of samples of the subframe ($n_{s\_sf}$) is a sum of P, Q and R;
wherein P is a product of a number of block symbols of the subframe ($n_{symb}$) and a Fast Fourier Transform (FFT) size ($n_{fft}$) of the block symbols;
wherein Q is a product of $n_{s\_cp}$ and the difference of $n_{symb}$ minus a number of the special block symbols of the subframe ($n_{special\_symb}$);
wherein R is a total number of samples to be considered for all time-domain guard periods of the subframe different from the common time-domain guard period ($n_{s\_special\_cp\_sum}$);
wherein $t_{sf}$ is a duration of the subframe;
wherein $n_{symb}$ is a sum of $n_{special\_symb}$ and a floor function of a quotient of U and V;
wherein U is $n_{s\_sf}$ minus a product of $n_{special\_symb}$ and $n_{fft}$; and
wherein V is a sum of $n_{fft}$ and $n_{s\_cp}$.

14. The apparatus of claim 13,
wherein $n_{s\_special\_cp\_sum}$ is $n_{s\_sf}$ minus the product of $n_{symb}$ and $n_{fft}$ minus the product of $n_{s\_cp}$ and the difference of $n_{symb}$ minus $n_{special\_symb}$.

15. The apparatus of claim 13,
wherein $$n_{s\_special\_cp\_sum} = \sum_{i=1}^{n_{special\_symb}} n_{s\_special\_cp}(i); \text{ and}$$

wherein $n_{s\_special\_cp}(i)$ is a number of samples of the time-domain guard period of the i-th special block symbol of the subframe.

16. The apparatus of claim 9,
wherein a number of samples of the common time-domain guard period is a product of W and a ceiling function of a quotient of a product of the common time-domain guard period and a sampling rate and W;
wherein W is a width of a wide data path of digital signal processing circuitry that processes the number of samples of the common time-domain guard periods.

17. The apparatus of claim 16,
wherein the samples of the time-domain guard periods different from the common time-domain guard periods are ignored by the digital signal processing circuitry.

18. The apparatus of claim 9,
wherein the apparatus is a cellular base station.

19. The apparatus of claim 9,
wherein the apparatus is a cellular user equipment.

20. A non-transitory computer-readable medium having instructions stored thereon that are capable of causing or configuring a computing system to perform operations comprising:
  processing a subframe as part of a time-domain signal frame structure used for radio frequency communications;
  wherein the subframe includes:
    a plurality of block symbols each having an associated time-domain guard period;
    one or more radio frequency (RF) switching guard periods; and
    wherein the time-domain guard period comprises a zero prefix, cyclic prefix or post fix;
  wherein each block symbol of the plurality of block symbols is either a common block symbol or a special block symbol;
  wherein the common block symbols have a common time-domain guard period with all other common block symbols of the subframe;
  wherein the special block symbols have a time-domain guard period different from the common time-domain guard period;
  wherein all the special block symbols in the subframe are placed into the one or more RF switching guard periods; and
  wherein two or more of the special block symbols have a time-domain guard period that is different from each other and that is different from the common time-domain guard period.

21. A method, comprising:
  processing a subframe as part of a time-domain signal frame structure used for radio frequency communications;
  wherein the subframe includes:
    a plurality of block symbols each having an associated time-domain guard period;
    one or more radio frequency (RF) switching guard periods; and
    wherein the time-domain guard period comprises a zero prefix, cyclic prefix or post fix;
  wherein each block symbol of the plurality of block symbols is either a common block symbol or a special block symbol;
  wherein the common block symbols have a common time-domain guard period;
  wherein the special block symbols have a time-domain guard period different from the common time-domain guard period;
  wherein all the special block symbols in the subframe are placed into the one or more RF switching guard periods;
  wherein the common time-domain guard period ($t_{cp}$) is greater than a delay spread of a channel in which the subframe is transmitted;
  wherein a number of samples of the common time-domain guard period ($n_{s\_cp}$) is a ceiling function of a product of $t_{cp}$ and a sampling rate of the subframe ($f_s$);
  wherein a number of samples of the subframe ($n_{s\_sf}$) is a sum of P, Q and R;
  wherein P is a product of a number of block symbols of the subframe ($n_{symb}$) and a Fast Fourier Transform (FFT) size ($n_{fft}$) of the block symbols;
  wherein Q is a product of $n_{s\_cp}$ and the difference of $n_{symb}$ minus a number of the special block symbols of the subframe ($n_{special\_symb}$);
  wherein R is a total number of samples to be considered for all time-domain guard periods of the subframe different from the common time-domain guard period ($n_{s\_special\_cp\_sum}$);
  wherein $t_{sf}$ is a duration of the subframe;
  wherein $n_{symb}$ is a sum of $n_{special\_symb}$ and a floor function of a quotient of U and V;
  wherein U is $n_{s\_sf}$ minus a product of $n_{special\_symb}$ and $n_{fft}$; and
  wherein V is a sum of $n_{fft}$ and $n_{s\_cp}$.

22. An apparatus, comprising:
  circuitry that processes a subframe as part of a time-domain signal frame structure used for radio frequency communications;
  wherein the subframe includes:
    a plurality of block symbols each having an associated time-domain guard period;
    one or more radio frequency (RF) switching guard periods; and
    wherein the time-domain guard period comprises a zero prefix, cyclic prefix or post fix;
  wherein each block symbol of the plurality of block symbols is either a common block symbol or a special block symbol;
  wherein the common block symbols have a common time-domain guard period with all other common block symbols of the subframe;
  wherein the special block symbols have a time-domain guard period different from the common time-domain guard period; and
  wherein all the special block symbols in the subframe are placed into the one or more RF switching guard periods;
  wherein the common time-domain guard period ($t_{cp}$) is greater than a delay spread of a channel in which the subframe is transmitted;
  wherein a number of samples of the common time-domain guard period ($n_{s\_cp}$) is a ceiling function of a product of $t_{cp}$ and a sampling rate of the subframe ($f_s$);

wherein a number of samples of the subframe ($n_{s\_sf}$) is a sum of P, Q and R;

wherein P is a product of a number of block symbols of the subframe ($n_{symb}$) and a Fast Fourier Transform (FFT) size ($n_{fft}$) of the block symbols;

wherein Q is a product of $n_{s\_cp}$ and the difference of $n_{symb}$ minus a number of the special block symbols of the subframe ($n_{special\_symb}$);

wherein R is a total number of samples to be considered for all time-domain guard periods of the subframe different from the common time-domain guard period ($n_{s\_special\_cp\_sum}$);

wherein $t_{sf}$ is a duration of the subframe;

wherein $n_{symb}$ is a sum of $n_{special\_symb}$ and a floor function of a quotient of U and V;

wherein U is $n_{s\_sf}$ minus a product of $n_{special\_symb}$ and $n_{fft}$; and wherein V is a sum of $n_{fft}$ and $n_{s\_cp}$.

23. A method, comprising:

processing a subframe as part of a time-domain signal frame structure used for radio frequency communications;

wherein the subframe includes:
- a plurality of block symbols each having an associated time-domain guard period;
- one or more radio frequency (RF) switching guard periods; and
- wherein the time-domain guard period comprises a zero prefix, cyclic prefix or post fix;

wherein each block symbol of the plurality of block symbols is either a common block symbol or a special block symbol;

wherein the common block symbols have a common time-domain guard period;

wherein the special block symbols have a time-domain guard period different from the common time-domain guard period; and wherein all the special block symbols in the subframe are placed into the one or more RF switching guard periods;

wherein a number of samples of the common time-domain guard period is a product of W and a ceiling function of a quotient of a product of the common time-domain guard period and a sampling rate and W;

wherein W is a width of a wide data path of digital signal processing circuitry that processes the number of samples of the common time-domain guard periods.

24. An apparatus, comprising:

circuitry that processes a subframe as part of a time-domain signal frame structure used for radio frequency communications;

wherein the subframe includes:
- a plurality of block symbols each having an associated time-domain guard period;
- one or more radio frequency (RF) switching guard periods; and
- wherein the time-domain guard period comprises a zero prefix, cyclic prefix or post fix;

wherein each block symbol of the plurality of block symbols is either a common block symbol or a special block symbol;

wherein the common block symbols have a common time-domain guard period with all other common block symbols of the subframe;

wherein the special block symbols have a time-domain guard period different from the common time-domain guard period; and wherein all the special block symbols in the subframe are placed into the one or more RF switching guard periods;

wherein a number of samples of the common time-domain guard period is a product of W and a ceiling function of a quotient of a product of the common time-domain guard period and a sampling rate and W;

wherein W is a width of a wide data path of digital signal processing circuitry that processes the number of samples of the common time-domain guard periods.

* * * * *